(12) United States Patent
Breslow et al.

(10) Patent No.: US 7,529,704 B1
(45) Date of Patent: May 5, 2009

(54) ON-LINE TRADING SYSTEM

(75) Inventors: Stuart Lee Breslow, Mountain Lakes, NJ (US); Alla Turetsky, Oradell, NJ (US); Robert Kodey, Philadelphia, PA (US); Todd Commisso, New York, NY (US)

(73) Assignee: Painwebber, Inc., Weehawken, NJ (US)

( * ) Notice: Subject to any disclaimer, the term of this patent is extended or adjusted under 35 U.S.C. 154(b) by 0 days.

(21) Appl. No.: 09/476,448

(22) Filed: Dec. 30, 1999

(51) Int. Cl.
*G06Q 40/00* (2006.01)

(52) U.S. Cl. ....................................................... 705/37

(58) Field of Classification Search .................... 705/37
See application file for complete search history.

(56) References Cited

U.S. PATENT DOCUMENTS

| | | | |
|---|---|---|---|
| 4,194,242 A | 3/1980 | Robbins | 364/200 |
| 4,346,442 A | 8/1982 | Musmanno | 364/408 |
| 4,376,978 A | 3/1983 | Musmanno | 364/408 |
| 4,566,066 A | 1/1986 | Towers | 364/408 |
| 4,597,046 A | 6/1986 | Musmanno et al. | 364/408 |
| 4,677,552 A | 6/1987 | Sibley, Jr. | 364/408 |
| 4,694,397 A | 9/1987 | Grant et al. | 364/408 |
| 4,751,640 A | 6/1988 | Lucas | 364/408 |
| 4,774,663 A | 9/1988 | Musmanno et al. | 364/408 |
| 4,823,265 A | 4/1989 | Nelson | 364/408 |
| 4,933,842 A | 6/1990 | Durbin et al. | 364/408 |
| 4,980,826 A | 12/1990 | Wagner | 364/408 |
| 5,038,284 A | 8/1991 | Kramer | 364/408 |
| 5,101,353 A | 3/1992 | Lupien et al. | 364/408 |
| 5,132,899 A | 7/1992 | Fox | 364/408 |
| 5,193,056 A | 3/1993 | Boes | 364/408 |
| 5,214,579 A | 5/1993 | Wolfberg et al. | 364/408 |
| 5,270,922 A | 12/1993 | Higgins | 364/408 |
| 5,297,032 A | 3/1994 | Trojan et al. | 364/408 |
| 5,375,055 A | 12/1994 | Togher et al. | 364/408 |
| 5,655,088 A | 8/1997 | Midorikawa et al. | 395/237 |
| 5,845,266 A | 12/1998 | Lupien et al. | 705/37 |
| 5,864,827 A | 1/1999 | Wilson | 705/35 |
| 5,864,871 A * | 1/1999 | Kitain et al. | 707/104 |
| 5,893,079 A | 4/1999 | Cwenar | 705/36 |
| 5,911,136 A | 6/1999 | Atkins | 705/36 |
| 5,918,217 A | 6/1999 | Maggioncalda et al. | 705/36 |
| 5,924,083 A * | 7/1999 | Silverman et al. | 705/37 |

(Continued)

OTHER PUBLICATIONS

DLJ Direct, "DLJ Direct Home Page" (visited Aug. 3, 1999) <http://www.dljdirect.com/> (1 pg.).

(Continued)

*Primary Examiner*—Andrew Joseph Rudy
(74) *Attorney, Agent, or Firm*—Proskauer Rose LLP (57) ABSTRACT

A computer-based system for trading financial instruments alerts a computer operated by a financial advisor at points where a client interacts with the system. Specifically, in response to the client entering an order to trade a financial instrument, a first alert is transmitted in real-time to the financial advisor's computer including information pertaining to the trade. In the case of validation, in response to the first alert, the user of the financial advisor computer can, in real-time, take action regarding the validated trade prior to execution of the trade. On the other hand, in the case of non-validation, a second alert is transmitted to the financial advisor's computer, and the user of the financial advisor computer can, in real-time, again take action regarding the non-validated trade prior to execution of the trade.

7 Claims, 3 Drawing Sheets

U.S. PATENT DOCUMENTS

| | | | | |
|---|---|---|---|---|
| 5,926,801 | A | | 7/1999 | Matsubara et al. ............ 705/37 |
| 6,018,722 | A | * | 1/2000 | Ray et al. ................. 705/36 R |
| 6,021,397 | A | * | 2/2000 | Jones et al. ................... 705/36 |
| 6,029,146 | A | * | 2/2000 | Hawkins et al. .............. 705/35 |
| 6,061,660 | A | * | 5/2000 | Eggleston et al. ............ 705/14 |
| 6,324,523 | B1 | * | 11/2001 | Killeen, Jr. et al. ............ 705/35 |
| 6,513,019 | B2 | * | 1/2003 | Lewis .......................... 705/35 |
| 6,556,976 | B1 | * | 4/2003 | Callen ......................... 705/37 |
| 6,594,643 | B1 | * | 7/2003 | Freeny, Jr. ................... 705/37 |
| 6,615,188 | B1 | * | 9/2003 | Breen et al. .................. 705/37 |
| 6,876,982 | B1 | * | 4/2005 | Lancaster .................... 705/37 |
| 6,895,472 | B2 | * | 5/2005 | Neiman et al. .............. 711/118 |
| 2001/0032154 | A1 | * | 10/2001 | Schummer ................... 705/30 |
| 2002/0002513 | A1 | * | 1/2002 | Chiasson ..................... 705/27 |
| 2002/0052816 | A1 | * | 5/2002 | Clenaghan et al. ............ 705/36 |

OTHER PUBLICATIONS

JH Darbie & Co., "JH Darbie Home Page" (visited Aug. 3, 1999) <http://www.jhdarbie.com/home.html> (1 pg.).

Being Seen, "Online Stock Brokers: The Essential Internet Investor" (visited Aug. 3, 1999) <http://beseen.com/stocks/brokers.html> (2 pgs.).

Accutrade, "Accutrade Home Page" (visited Aug. 3, 1999) <http://www.accutrade.com/> (1 pg.).

RapidTrade, "RapidTrade Home Page" (visited Aug. 3, 1999) <http://www.rapidtrade.com/> (1 pg.).

SEC, "Learn About Investing: The Internet and Online Trading" (visited Aug. 3, 1999) <http://www.sec.gov/consumer/jneton.htm> (2 pg.).

Standard and Poor's, "Retail Investor Services" (visited Aug. 3, 1999) <http://www.stockinfo.standardpoor.com/> (1 pg.).

Day Trading Stocks.com, "Day Trading Stocks.com Home Page" (visited Aug. 3, 1999) <http://daytradingstocks.com/> (3 pgs.).

E*trade.com, "Etrade Home Page" (visited Aug. 3, 1999) <http://www.etrade.com/cgi-bin/gx.cgi/AppLogic%2bHome> (1 pg.).

Ameritrade, "Ameritrade Home Page" (visited Aug. 3, 1999) <http://www.ameritrade.com (1 pg.).

Charles Schwab, "Charles Schwab Home Page" (visited Aug. 3, 1999) <http://www.schwab.com/SchwabNOW/mainBody.html> (2 pg.).

Daytek Online, "Daytek Home Page" (visited Aug. 3, 1999) <http://www.daytek.com/>(1 pg.).

The Daytrades Network, "The Daytraders Network Home Page" (visited Aug. 3, 1999) <http://www.daytradersnet.com/> (2 pg.).

Discover Brokerage, "Discover Brokerage Home Page" (visited Aug. 3, 1999) <http://www.lombard.com/> (1 pg.).

Fidelity Brokerage, "Fidelity Brokerage Home Page" (visited Aug. 3, 1999) <http://www300.fidelity.com/index.shtml> (1 pg.).

Suretrade, "Suretrade Home Page" (visited Aug. 3, 1999) <http://www.suretrade.com/Navigation/Visitor/welcome.html> (1 pg.).

Trading Direct, "Trading Direct Home Page" (visited Aug. 3, 1999) <http://www.tradingdirect.com/YOR/homeformat.html> (1 pg.).

American Express, "American Express Financial Direct Home Page" (visited Aug. 3, 1999) <http://www.americanexpress.com/amex/bu/cda/main/1,1484,116,00.asp> (2 pgs.).

\* cited by examiner

ON-LINE TRADING SYSTEM

BACKGROUND OF THE INVENTION

1. Field of the Invention

The present invention relates to financial business systems; and more particularly to a brokerage trading system using an Internet-based graphical user interface.

2. Description of the Prior Art

Freedom to purchase and sell the numerous corporate securities which are actively traded on exchanges such as the New York Stock Exchange, The New York Bond Exchange and the American Stock and Bond Exchanges, The Midwest and Pacific Coast Regional Exchanges and the NASDAQ Over-the-Counter Market, is a cherished but limited right. Imperfect knowledge of trading procedures and restricted access to securities pricing information oftentimes inhibit or prevent purchase and sale of securities by individual investors.

Trading procedures have been facilitated by computer-based business systems, which are conventionally used to effectuate financial transactions. These automated financial business systems have a variety of features which include entry of customer data, data processing means, obtaining quotes/bids, retrieving bids and security pricing from a remote database, making a stock order within a preselected time limit or collecting requests for quotes and selecting the best quotes to accept.

For example, U.S. Pat. No. 4,823,265 to Nelson teaches a system and method for processing transactions in renewable options in stocks and other securities. The system provides for entry of customer data and transaction data, processing the data, and a mechanism for storing the data. Utilizing the system, the options may be renewed periodically for a fixed term, until a designated event occurs, or perpetually. Means for processing transactions in such renewable options are also disclosed.

U.S. Pat. No. 4,694,397 to Grant, et al. discloses an apparatus for interfacing a banking system and a brokerage system having a number of brokerage office. A securities brokerage/cash management system is disclosed by U.S. Pat. No. 4,346,442 to Musmanno. The Musmanno system comprises, among other components, subscriber initiated use of a transaction charge card and checks, which are administered by a first institution; and participation in at least one short term investment, administered by a second institution.

An automated investment system is disclosed by U.S. Pat. No. 4,751,640 to Lucas. The '640 patent teaches a system in which clients are directly coupled to a processing means for accessing a storing means and recording investment vehicle purchases. U.S. Pat. No. 4,980,826 to Wagner discloses a method and system having a voice entry data device, and means for storing CFTC requirements and regulations. U.S. Pat. No. 5,038,284 to Kramer discloses a system that includes station means for converting manually entered data relating to open outcry transactions into first signals and for receiving second signals. U.S. Pat. No. 5,101,353 to Lupien, et al. discloses a system for providing liquidity to markets for investment securities and for managing in a real time environment the interaction of one or more large, institutional portfolios of investment securities with each other and with the securities market.

None of the patents discussed above disclose an Internet-driven brokerage interface for individual and institutional investors which offers transaction helper software and financial advisor assistance.

U.S. Pat. No. 5,297,032 to Trojan, et al. discloses a system for controlling the operation of a trader work station as integrated in a network for the trading of financial instruments wherein a database is configured to deliver an on-line datastream to a plurality of traders. Like the patents previously discussed hereinabove, the '032 patent does not utilize an Internet-drive system which offers brokerage services and assistance nor does it employ a browser interface or transaction helper software.

There remains a need in the art for an on-line securities trading system which permits investors to access a brokerage interface via the Internet, and which provides a user friendly graphical user interface, offers financial assistance and enables the investor to view account information, receive quotes and execute trades on a personal computer.

SUMMARY OF THE INVENTION

The present invention provides an on-line trading system comprising an Internet HTML-based interface which enables brokerage clients to view account holdings, receive quotes for and execute trades based on account holdings. Generally stated, the system comprises (i) a client web browser; (ii) a brokerage interface; (iii) a providing server for handling account information and research requests; (iv) a quote server for providing real-time stock market quotes; (v) a connecting server for connecting the providing server to a mainframe computer; (vi) an advisor computer for monitoring and assisting in the execution of client transactions; and (vii) a trading system connected to the mainframe computer, which has access to a plurality of trading exchanges.

In operation, a client utilizes a client computer to access a brokerage interface via the Internet. The brokerage interface contains administrative information, such as for example, client account information as well as other information required to conduct trades over the Internet. It also provides a graphical user interface which enables clients to view this information.

A client is enabled to access his or her accounts through an initial enrollment procedure performed by the client, the client's personal financial advisor or a client service associate. Once initial enrollment has been completed, the client can access his or her accounts through a password protected validation procedure. Once the system is accessed, the client can view his or her account holdings, obtain quotes and other market information such as news and research for proposed trades, and execute trades thereon. Quote requests are forwarded by the system to the providing server, a multi-process server having the capability to handle all account information and research requests. The providing server is linked to a quote server, a system for providing real-time stock market quotes in response to client queries. After a quote has been given, it is transmitted back to the brokerage interface where the client can opt to submit an order or take no further action.

If the client chooses to effect a trade, he or she places a trade order through the brokerage interface which forwards the information to the providing server which, in turn, forwards the information via a connecting server to a mainframe computer. The mainframe computer validates the order based a series of predetermined business rules, and sends a recap of the order back to the brokerage interface where the client then approves the order and provides his or her password as an additional security measure. The order is then sent back to the mainframe where it is confirmed and accepted. A reference number is assigned to it, and confirmation is provided back to the client at the brokerage interface. At this time, intermediate notification is sent to the client's personal financial advisor to alert the advisor as to the action taken. Advantageously, the two phase validation procedure protects against potential orders with errors, it times out orders for extra security (i.e. cancels orders where there is a substantial time lapse between placing and execution of an order) and minimizes the security risk of a computer hacker simulating an unauthenticated trade.

The mainframe computer sends the order to the trading system which forwards the order onto the exchange. If the order was placed during hours where the exchange is closed, it is held in a message queue and recovery file until the exchange reopens. With this procedure, orders may be placed and completely validated via the system of the present invention 24 hours per day, 7 days per week. Once executed, client account information is continuously updated for further validating and client credit checks.

The mainframe computer also sends all information pertaining to the trade to a financial advisor on a real-time basis; in this way, the system allows financial advisors to view and correct client trades. Alternatively, the financial advisor can contact the client to discuss the proposed trade. This permits the financial advisor to monitor the account and assist the client in the transaction, if necessary.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
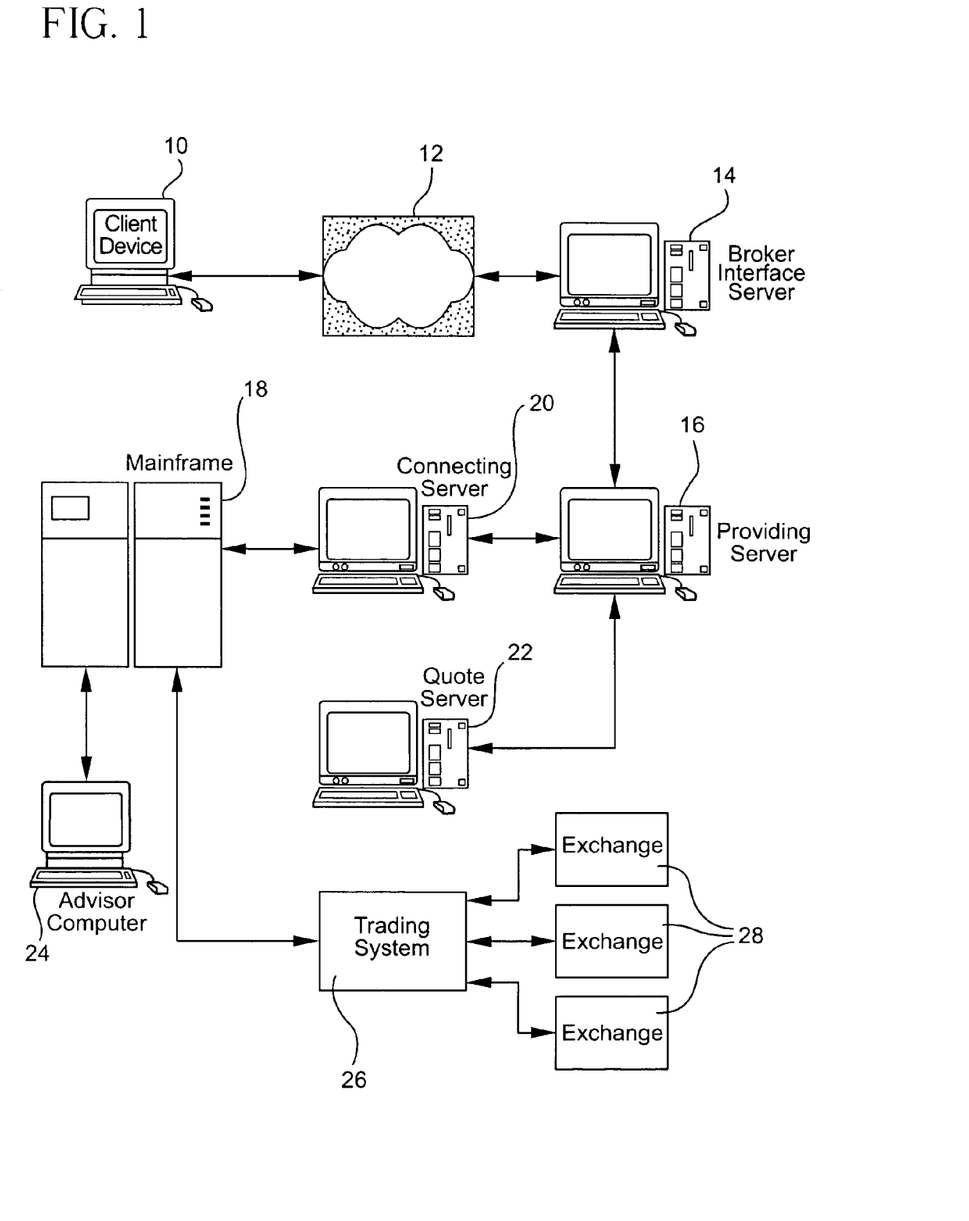
FIG. 1 is a diagram of the on-line trading system of the present invention.

Referring to FIG. 1 of the drawings, there is shown the on-line trading system of the present invention. Generally stated, the system comprises client computer 10 provided with a web browser for connecting to the world wide web ("WWW") 12; brokerage interface 14 having a HTML-based brokerage interface; providing server 16 connected to brokerage access server 14; mainframe computer 18; connecting server 20 connecting providing server 16 to mainframe 18; quote server 22 connected to providing server 16; advisor computer 24; and trading system 26 connected to mainframe computer 18. Trading system 26 has access to a plurality of stock exchanges 28, such as the New York and American Stock Exchanges and NASDAQ exchanges for example.

Preferably, providing server 16 comprises the PaineWebber Edgeserver. Quote server 22 can comprise the Reuters Triarch system, which provides real-time stock market quotes to providing server 16. Preferably, advisor computer 24 is comprised of the PaineWebber ConsultWorks workstation.

Figure 2:
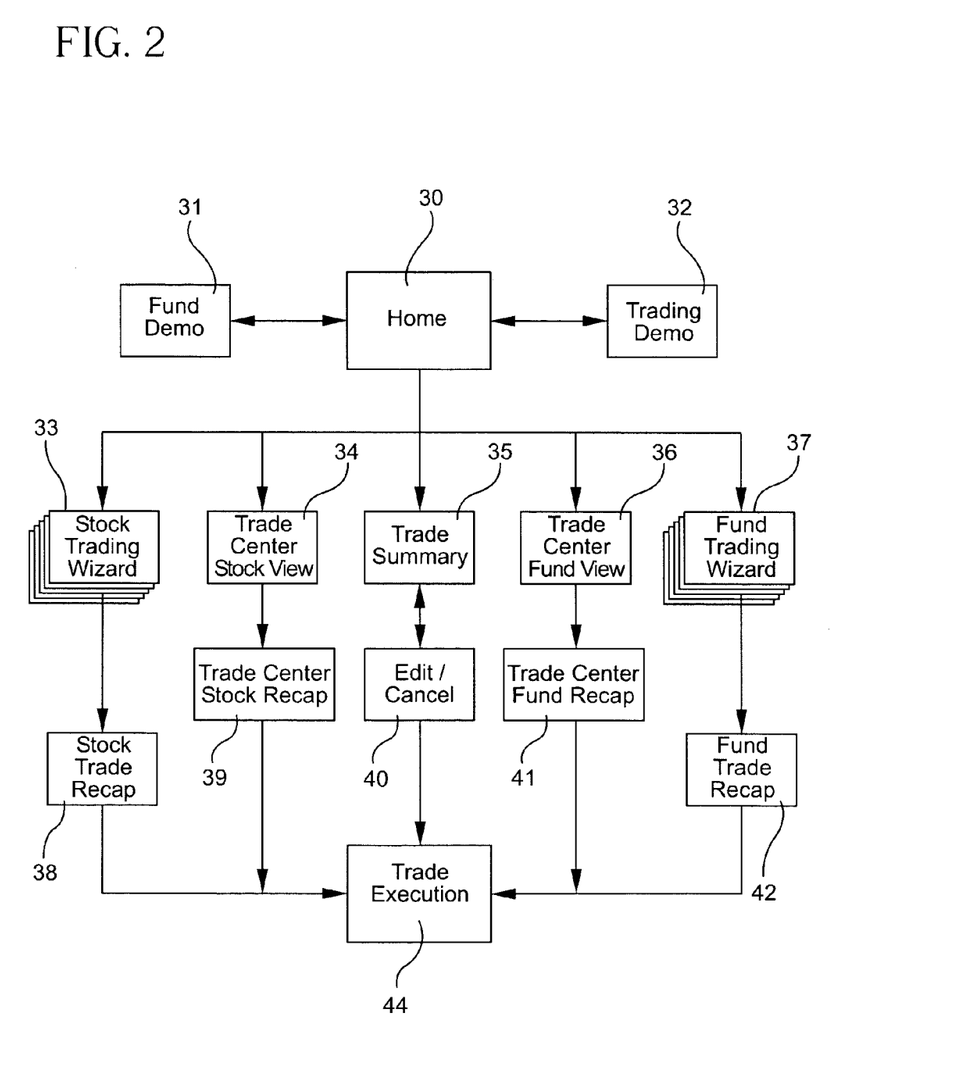
FIG. 2 is a site layout schematic of the HTML-based brokerage interface.

As described above, brokerage access server 14 incorporates a HTML-based brokerage interface. In general, the brokerage interface provides a means by which a client can interact with the trading system of the present invention. One such example of a brokerage interface, as shown in FIG. 2, comprises: home page 30; stock trading demonstration page 32 linked to the home page; fund demo trading page 31 linked to the home page; a plurality of stock trading wizard pages 33 linked to the home page; a plurality of fund trading wizard pages 37 linked to the home page; trade center stock view page 34 linked to the home page; trade summary page 35 linked to the home page; trade center fund view page 36 linked to the home page; trade execution page 44; stock trading recap page 38 linked to trade execution page 44 and stock trading wizard pages 33; trade center stock recap page 39 linked to trade execution page 44 and trade center stock view page 34; edit/cancel trade page 40 linked to trade summary page 35 and to trade execution page 44; trade center fund recap page 41 linked to trade execution page 44 and trade center fund view page 36; and fund trading recap page 42 linked to the trade execution page 44 and the fund trading wizard pages 37. Stock trading wizard pages 33 are provided with interactive information to assist the client in trading stock. Similarly, fund trading wizard pages 37 are provided with interactive information to assist the client in trading mutual funds.

Figure 3:
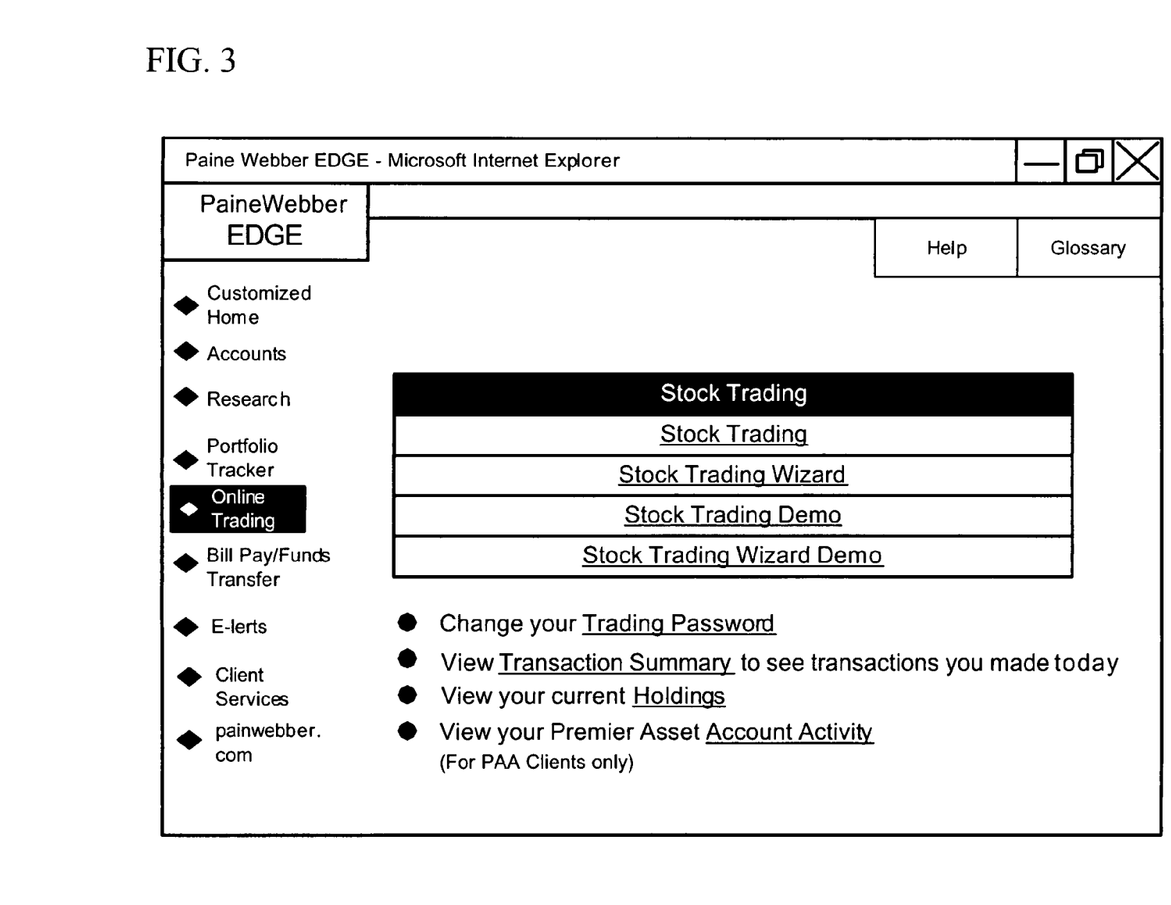
FIG. 3 depicts a sample home page of the HTML-based brokerage interface.

Optionally, these pages may have links to other pages, such as changing password pages, etc. FIG. 3 shows an example of home page 30. In the figure, links are underlined as normally done with HTML web links. As another option, HTML may be replaced by DHTML, XML or other similar web page markup language.

In practice, a client connects his or her computer via a web browser to an HTML-based Internet on-line trading system having a brokerage interface. The client accesses his or her accounts either through an initial enrollment procedure or, once initial enrollment has been completed, through a password protected validation procedure. Once entered into the system, the client can view his or her settled account holdings, or current trades, obtain quotes for proposed trades, and execute trades thereon. If quote requests are desired, the system forwards these to a provider server, which has the ability to handle all account information and research requests. For example, the provider server is linked to a quote server which provides real-time stock market quotes which are transmitted back to the brokerage interface where the client can opt to submit an order or take no further action.

If a client chooses to place a trade, he or she forwards a trade order through the brokerage interface which sends the information to the provider server which, in turn forwards the information to the mainframe computer. The order and client credit is validated by the mainframe computer, and where successful validation occurs, the client receives an immediate recap of the order back. If the client approves the order, he or she enters a password using the brokerage interface, a reference number is assigned to the order and confirmation is returned to the client.

In the instance where the order is not validated, the system blocks the client from further action on that order. The system thereafter notifies the client and the client's financial advisor that the order has been blocked, the reasons for blocking the order, and suggests steps that may be followed by the client or his or her financial advisor to remediate and revive the order.

The process for validating on-line trades comprises the steps of: applying a set of applicable on-line trade business rules; validating an account against a reference database containing a list of preselected client accounts; checking trade allotment (if applicable); validating stock symbol; obtaining a pricing quote; checking same side and opposite side orders; calculating cost; verifying the client's positions for sell orders; verifying client's available funds for buy orders; maintaining a state for Internet based applications; sending an alert to a financial advisor; assigning codes (i.e., in those instances where account trading restrictions or other situations exist); and assigning informational costs to the order. The cost is a cash cost or margin trade cost, depending on the characteristics of the security and the account in which the transfer is to be effected.

Once the system validates the order, it is transmitted to the client for approval. If the client approves the order, he or she reenters their password and re-transmits the order to the mainframe. The system executes an order confirmation. This comprises the steps of: checking potential order database for changes in the order since the time of validation; repeat verification of positions or balances; update positions or balances; assigning an order reference number for the trade order; sending an order having the reference number to a trading system; storing the translated order in a transaction database; sending an alert to a financial advisor; and assigning error/informational codes.

Referring again to FIG. 1 in light of the foregoing system overview, there is shown a diagram of the on-line trading system of the present invention. Client computer 10 may comprise any commercially available personal computer equipped with a web browser for connecting to the Internet, or any other web-enhanced device. While the invention has been described herein with reference to a client computer, as is known in the art, the principles of the invention are applicable to any web-enabled device. Typical web-enabled devices include web television and the like. The required speed of transmission of data through the trading system will be limited only by the speed of the client's Internet connection speed. Generally, a modem averaging 28.8 bps capacity will exhibit sufficient transmission capacity. Brokerage interface 14 comprises a combination of mid-range multiprocessor-based servers (i.e. proxy server, web server, brokerage interface server) utilizing standard operating systems and software designed to drive the operation of the particular hardware. One example of a proxy server useful in the practice of the present invention is Proliant series computer from Compaq, running Windows NT from Microsoft and proxy server software. An example of a useful webserver and brokerage interface server, respectively, is the Sun Ultra 2 from Sun Microsystems running Solaris 2.6 with the webserver running Netscape Enterprise 3.51 software and the brokerage interface running a proprietary brokerage access code for transmitting information between the webserver and the providing server, such as available from Reality OnLine, a division of Reuters Company.

A providing server useful in the trading system likewise includes any mid-range multiprocessor-based hardware running a standard operating system. For example, a Sun Enterprise 4500 server running Solaris 2.6 with Sybase, Version 11.0.2 software such as the proprietary PaineWebber Edgeserver, is a particularly useful providing server. Connectivity through the trading system uses standard TCP/IP sockets-based protocol.

When a client initially accesses the system, an unused registration identification is assigned to that client's accounts. The system forwards this registration identification to an external source which, in turn, mails this registration identification to the client. After receipt of this identification, the client then accesses brokerage interface 14 where he or she is prompted to enter information including, but not limited to: registration identification; a user identification and password (created by the client); social security number and e-mail address. Brokerage interface 14 then checks this information to ensure that the user identification is unique. If not, an error is returned to the user. If so, brokerage interface 14 verifies that the registration identification exists and has not yet been used. If the identification does not exist, or if it has been already used, an error message is returned to the client. If all of the foregoing checks are successful, the request is passed on to providing server 16 for verification. Comparison of the client's actual and provided social security number is one example of a simple and reliable verification method. If providing server 16 successfully validates the client, brokerage interface 14 is updated to reflect use of that particular identification. If the sign-up is invalid, the client is informed of the problem and allowed to retry. If the sign-up is successful, the client is prompted to login to the system. The system also provides a method for resetting a client's password, if for example, the client forgets their password. In this instance, brokerage interface 14 would change and confirm the password.

After successfully completing the initial sign-up phase, the system logic requires that the client only enter his or her user identification and password to access brokerage interface 14. Brokerage interface 14 matches the user identification and password with the appropriate registration identification and forwards this (the registration identification) to providing server 16. The providing server 16 verifies the registration, and if valid, transmits the client's account information back to brokerage interface 14, where the client can then request additional information (discussed below). If there is a problem with the login, providing server 16 returns an error message to brokerage interface 14. Preferably, the system is configured to restrict access to a client not having a U.S. residence. In this instance, brokerage interface 14 would transmit a message to the client during enrollment noting that he or she is located in a country having restricted country access. In another embodiment, providing server 16 contains additional information which would restrict certain predetermined clients from executing trades via the trading system. These clients would be permitted to view, but not trade upon, their accounts. If this feature is present, the system would forward a specially assigned password to the client during the initial sign-up phase. Advantageously, the two-phase enrollment procedure of the present invention provides a secure and reliable method by which access to client accounts is effected.

The foregoing logic structure is represented in part in Table I by the following set of functional input/output ("I/O") field mappings between brokerage interface 14 and providing server 16; in which the brokerage interface and the providing server I/O's are represented by FieldName[Width] with width representing the width of the character string:

TABLE I

| | Brokerage interface | Providing Server |
|---|---|---|
| INPUT | Struct session Login Request RegID[12] | usr_profile_db..user_profile_reg_id[c11] |
| OUTPUT | Struct Session Response | db##..account profile, user profile db..olt profile |
| | isTradingEnabled[4]; mustChangePassword[4] | olt flg[c2] |
| | mustChangeTradingPassword[4]; | must_change_pwd[c2] |

The session login is the first function called when the client logs in to the trading system. It is called only once during a client's session. This function is used to track a last login date/time and a login count for each user, as well as to grant and/or deny access to specific system features.

In accordance with the present invention, the trading system transmits the client's associated account profile stored in providing server 16 to brokerage interface 14 once successful login has been attained. This information includes all relevant account information such as account number, total assets, trades made in a prescribed period, the maximum number of trades available without surcharge, open orders, supplemental fees, commissions waived, and the like.

With this information, the client can decide how to proceed, i.e., whether to initiate quote lookups, cancel existing orders, place new orders, or take no further action. Preferably, the trading system of the present invention includes trading wizards, helper programs which take the client through the process of online trading one step at a time so they can become comfortable with the process. Preferably, the trading wizards are directed to stock, mutual fund or fixed income trading.

Where the client desires a quote, the system transmits this request via providing server 16 to quote server 22. Quote server 22, in turn, transmits real-time quotes back to the brokerage interface for client review. This information may include: symbol; security or fund name; open price; high day price; low day price; last price; tick; volume; percent change from the previous close; total change from the previous close; previous close; date; time; high 52 week; low 52 week; P/E ratio; underlying currency of security; bid; ask; bid size; ask size; yield; exchange; dividend; dividend date; last date security will exchange without the dividend; and earnings per share. Alternatively, quote server 22 would transmit delayed quotes back to brokerage interface 14 for client review. This typically occurs where real-time quotes are unavailable. In this instance, the client would be informed that they are viewing a twenty minute delayed quote. In this context, a dealyed quote comprises the bid and ask price, last sale, volume and volume weighted. The quote server also provides real-time and/or delayed market information such as news and historic charts. An example of a quote server useful in the practice of the present invention is a series of Sun Microsystems servers which are capable of providing real-time quote feeds, such as the Reuters Triarch available from Reuters Company. This provides a lower level component written in ANSI C, and a higher level component of object-oriented class libraries written in C++, both of which function together to provide easy and consistent access to real-time and historic data.

The client may enter an order for execution on one or more of account holdings, including buys and sells. The system uses a multistep validation and confirmation procedure to process trades which advantageously protects against order errors, cancels orders where a substantial time lapse between placing and execution of an order occurs, and minimizes the security risk of a computer hacker simulating an unauthenticated trade. Instruments which may be traded in accordance with the present invention include virtually any financial instrument, including equity securities, mutual funds, bonds, options, and the like, with equity positions and mutual funds being particularly well suited for use with the on-line trading system of the invention. Equity securities are the most preferable financial instrument which may be traded in accordance with the present invention.

In accordance with the system described herein, the client interacts with brokerage interface 14 to place an order to trade a particular financial instrument. This order is forwarded to providing server 16, which, in turn, transmits the order to mainframe 18 via connecting server 20. Of course, the client may abort the order at any point during the transaction. For the purpose of the present invention, connecting server 20 may be any distributed server such as the RS6000, running CICS/6000 AIX (using an ECI connection), both from IBM. Mainframe 18 serves numerous functions in executing the trade order including order validation; customer credit validation; checking and updating positions and balances; creating order numbers; formatting orders; confirmation of orders; and maintenance of a potential order database. The potential order database is a temporary store for potential orders awaiting confirmation from the client. Potential orders which are not confirmed within 90 seconds after entry are aborted, entries in this database are purged nightly to remove any confirmed or unconfirmed trades older than 60 days. Any high-end mainframe computer containing an operating system which supports CICS and MQ from IBM is useful in the present invention. A particularly well-suited mainframe computer is the Skyline 650 sold by Hitachi Ltd., running an IBM OS/390 operating system As an additional feature, the trading system may include components connected to mainframe 18 which enable viewing of an individual trade and the execution of any necessary corrective action. One such example is a central order room capable of viewing and connecting trades by a mainframe-based manually operated application such as a direct order routing system ("DORS") which permits the entry and modification of orders. In this instance, a hierarchy of authority for viewing and correcting individual trades execution exists. That is, DORS has higher trade correction authority than the financial advisor, who, in turn, has authority to correct client mediated trades (discussed below). Importantly, the financial advisor always has the ability to correct client mediated trades, regardless of the presence of a central order room.

When the order is forwarded by the client, mainframe 18 applies a set of predetermined business rules and calculations designed to ensure that the client does not place himself or herself at risk. The system also allows for account-based business rule customizations. Preferably, the business rules are real-time and customizable. That is to say, they can be customized at anytime with such customizations immediately reflected in the rules. An example of a set of business rules which may minimize client risk in equities trading include:

TABLE II

1. On-Line trading clients may only trade cash and margin activity. All other activity would be prohibited from on-line trading,
2. Prior to performing any start of the day or intra-day calculations, the system first determines if an account is a cash account or a margin account and if a margin account, whether or not a security is marginable.
3. Upon order entry, if an account is a margin account, all orders should be booked as margin activity in accordance with the margin-related calculations regardless if the security is marginable or non-marginable.
4. The use of two central calculations determine funds availability; cash and margin calculation. The margin calculation should include the cash calculation as part of its overall total. When releasing funds to either calculation for sell execution, drops, cancels, busts, etc., money should be credited back to the one of the two calculations depending on what type of account the client is trading. For buys, positions will also be adjusted.
5. Upon order entry, a client would respond to questions asking if the order is a result of a recommendation of their broker. If yes, the order should be processed as solicited. If no, it should be processed as unsolicited.
6. With a cash account, clients will not owe money through the on-line system. With margin accounts, clients will not enter into Fed or House Calls through the on-line system. Clients will be able to trade up to the value if their intraday calculation power for marginable securities.
7. Once a buy order has been executed, that security is considered long in the account for the amount of shares for which the order was placed. The client should then be able to sell that security, on a same day trade basis, up to the total amount of shares.
8. Clients will be permitted to day trade an individual security as long as the appropriate funds and/or buying power are able to cover the purchase of the security and if the security is held long in the account in a trade date basis. If the trade is not available or adequate, the trade will be blocked.
9. Over-the counter buys less than $5.00 per share are not permitted.
10. For cash or margin accounts, if the on-line start of the day or intraday balance is less than or equal zero, no buy orders are allowed.

TABLE II-continued

11. Financial advisor activity on a particular account must be included in the start of the day or intraday balances and positions. (Subtract all open orders from SOD)
12. Prices are set to calculate open limits, stops, stop limits and market (bid or ask).
13. Cancels (partial, full, cancel/replace), executions, rejects, drops, and busts must be reflected in daily balance and positions.
14. No credit for open sell orders. No credit for unsettled calls.
15. Clients will receive credit of funds and substraction of positions for unsettled sells.
16. The system does not handle real-time pricing of portfolios.
17. Closed end funds are traded as equities and should be treated as marginable securities.
18. For marginable securities, the system should use the greater of Reg T for equities (50%) of the House Security Maintenance Requirement for that security.
19. The system should assume 50% for House Excess calculations unless the security has different requirements.

Thereafter, logic instructs mainframe 18 to execute the following validation events: (1) validation of the client account against a reference database listing preselected client accounts; (2) checking the client trade allotment; (3) validation of the stock symbol entered by client; (4) obtaining pricing quote; (5) checking same-side and opposite side orders; (6) calculating cost of trade orders (i.e. cash or margin trade cost); (7) verifying client's positions for sell orders; (8) verifying funds available for buy orders; (9) maintaining a state for the Internet-based applications; (10) sending an alert to a financial advisor; (11) assigning error/informational error codes; (12) blue sky checks; (13) financial advisor registration; and (14) research or restrictions in conjunction with solicited orders. Preferably, the step of assigning error/informational codes includes assigning severities in real-time customizable codes.

As indicated by the foregoing business rules, the trading system references start-of-day and intraday calculation positions and balances for all clients enrolled in the system. The start-of-day calculations are based only on cash accounts and margin accounts. All other types of accounts will be restricted from on-line trading. Based on this start-of-day calculation, a running intraday balance for positions and balances will be maintained reflecting all activity.

The intraday balance will reflect all trade activity from both client entered transactions as well as broker-entered transactions (discussed below) and will be continuously updated.

At the start-of-day and for validating each order, the system first determines which calculation (cash or margin) should be used to determine the funds available for an account. As an example, the system may determine whether the account is a cash or margin account based on the $10^{th}$ position of the Standard Instruction Code from the "N" page on an account inquiry. If the code is "9" then the margin calculation is used. If it is a "0", then the cash calculation is used. Where the account is a cash account, all orders are processed as cash activity.

The start-of-day cash calculation ("CSOD") is used as a starting point at the beginning of each business day and is updated throughout that day using the running intraday calculations. The start-of-day calculation for money funds would be calculated as follows:

---
Trade Date Balance plus
---
Add All Money Market Funds
Subtract Debit Card Activity
Subtract Encumbered Funds
Subtract 100% Principle Value of Open Buy Orders
---

As indicated, once the start-of-day balance has been determined, it is continuously updated throughout the day, creating a running intraday calculation. This intraday balance includes all activity entered by a client or their broker.

|  | Order | Cancels/Rejects/Drops | Execution | Execution Busts |
|---|---|---|---|---|
| Buys | Reduce balance by 100% value of trade. Block order if value is >than Intraday Calculation and return balance to its previous value. | Upon receiving a UR OUT for the cancel orders only: Full Cancel: Increase balance by 100% of the value of open shares canceled. Partial Cancel: Increase balance by 100% of the value of shares canceled. Cancel/Replace: Increase balance by 100% of the value of open shares canceled and reduce balance by 100% of value of replacement trade. Rejects: Increase balance by 100% of the value of number of shares rejected. Drops: Increase balance by 100% of the value of number of shares dropped. | Increase position by trade's number of shares. These positions are now long positions in which the client would be able to sell same day. Adjust the funds available by recalculating the original order with the executed price. | Reduce positions. |
| Sells | Reduce position by trade's number of shares. If the client | Upon receiving a UR OUT for the cancel order only: Full Cancel: Increase | Increase balance by 100% value of trade. Adjust the funds | Reduce balances by 100% of value |

-continued

| Order | Cancels/Rejects/Drops | Execution | Execution Busts |
|---|---|---|---|
| does not hold the securities at all, then the system should block the order. (Clients will be able to sell securities that have not settled yet.) | positions by the number of open shares canceled. Partial Cancel: Increase positions by number of shares to be canceled. Cancel/Replace: Increase positions by entire number of open shares canceled and reduce positions by the number or shares for replacement order. Rejects: Increase positions by number of shares rejected. Drops: Increase positions by number of shares dropped. | available by recalculating the original order with the executed price. | of the trade. |

After the first trade has been executed, the resulting value of the start-of-day balance becomes the intraday balance. All trades sent after the first order of the day will be compared against this balance. This balance excludes any transactions that are included in the daily batch cycle, such as: cash withdrawals/deposits, check deposits/withdrawals, transfers between accounts, etc. In accordance with the business rules, if the start-of-day balance is negative or zero, then the client is blocked from sending any buy orders. If the client has fully paid for securities in a cash account, these securities will not count as purchasing power for new buy orders. Of course, certain features of the start-of-day and intraday calculations can be overridden by customization.

As the business rules indicate, clients will have the ability to day trade. That is to say, they will be able to buy and sell the same security in a single day so long as they have the funds available and they receive the proper executions. For example, if a client has sufficient funds and buys IBM, the client can thereafter resell those same shares even if the shares have not completed the settlement cycle. As another example, if a client holds 200 shares of IBM long to start the day but does not have any value in his money funds, the client would be blocked if he or she tried to place a buy order. However, if the client liquidates his or her IBM position there would be a release of funds to the balance in the value of that order which would enable the client to place buy orders up to the value of new balance.

In order to determine the relative funds available for margin account orders ("MSOD"), both starting margin account ("SMA") and House Excess ("HE") are recalculated after each trade throughout the day. The purpose of the recalculation is to ensure that a client's funds is not overstated and to protect them from trading into a call position. Start-of-day calculations are established for both SMA and HE. This is done by first adjusting both for open buy orders. After the adjustment, any cash/money market funds are added, and pending debit card activity subtracted. The remaining balance reflects the SMA and HE start-of-day balance. These calculations are as follows:

Step 1: Select the lesser of the SMA or HE from the previous night's batch cycle. Once either SMA or HE has been selected, that figure will be used in the following steps. The one not selected does not need to be recalculated for additional balances until the next day, at which point the lesser of the two will be selected.

Step 2.: Add the cash balance to the balance selected in Step 1.

| Lesser of HE or SMA selected in Step 1 plus: |
|---|
| Add Trade Data Balance |
| Add All Money Market Funds |
| Subtract Debit Card Activity |
| Subtract Encumbered Funds |
| Subtract Open Orders |

This becomes the start-of-day funds available balance for the margin calculation. The cash portion of this calculation (Trade date balance+All MMF−Debit Card Activity−Encumbered Funds) should be the same as the figures in the cash calculation.

Step 3: Adjust the funds available balance for open buy orders. The system determines whether the security is marginable or non-marginable. This must also be determined prior to calculating each order within a margin account intraday.

| | Non-Marginable Securities | Marginable Securities |
|---|---|---|
| MSOD | MSOD - 100% of value of security | MSOD - (Value of the open buy order + the greater of Reg. T for equities (50%) or the House Security Maintenance Requirement) |

Step 4: The result of this adjustment is the final margin start-of-day balance for margin accounts. In accordance with the business rules, if the start-of-day balance is negative, the system will reject all buy orders for the client unless the client frees up funds by selling a security they hold long on a trade date basis. If this puts the balance at a positive, the client will be able to buy securities in that amount. The intraday running balance will include all client and broker-entered orders. The start-of-day positions and balances are adjusted throughout the day.

The first order of the day is applied to the single start of day calculation. After the adjustment, each subsequent order is applied to the new intraday calculation.

Order

|  | Marginable | Non-Marginable |
|---|---|---|
| Buy | Reduce balance by the value of trade X the greater of Reg T for equities (50%) or the House Security Maintenance Requirement. | Reduce balance by 100% value of trade. |
| Sell | Reduce positions by trade's number of shares. | |

Execution

|  | Marginable | Non-Marginable |
|---|---|---|
| Buy | Increase positions by trade's number of shares. Adjust the funds available by recalculating the original order with the executed price. | |
| Sell | Increase margin balance by the value of trade X the greater of Reg T for equities (50%) or the House Security Maintenance Requirement. | Increase margin balance by 100% value of trade. |

Execution Busts

|  | Marginable | Non-Marginable |
|---|---|---|
| Buy | Reduce positions by trade's number of shares and adjust funds available back to original orders. | |
| Sell | Reduce margin balance by the value of trade X the greater of Reg T for equities (50%) or the House Security Maintenance Requirement. | Reduce margin balance by 100% value of trade |
| Cancel | Upon receiving a UR OUT for the cancel orders only: Full Cancel: Increase margin balance by the value of trade X the greater of Reg T for equities (50%) or the House Security Maintenance Requirement for the number of open shares canceled. Partial Cancel: Increase margin balance by the value of trade X the greater of Reg T for equities (50%) or the House Security Maintenance Requirement of the number of shares canceled. Cancel/Replace: Increase margin balance by the value of trade X the greater of Reg T for equities (50%) or the House Security Maintenance Requirement of the value of open shares canceled and reduce the balance by the value of trade X the greater of Reg T for equities (50%) or the House Security maintenance Requirement for the Replacement order. | Upon receiving a UR OUT for the cancel orders only: Full Cancel: increase margin balance by 100% of the value of open shares canceled. Partial Cancel: Increase margin balance by 100% of the value shares canceled. Cancel/Replace: Increase margin balance by 100% of the value of open shares canceled and reduce balance by 100% of value of replacement trade. |
| Rejects | Increase margin balance by the value of trade X the greater of Reg T for equities (50%) for the House Security Maintenance Requirement for the number of shares rejected. | Increase margin balance by the value of trade X the greater of Reg T for equities (50%) for the House Security Maintenance Requirement for the number of shares rejected. |
| Drops | Increase margin balance by the value of trade X the greater of Reg T for equities (50%) or the House Security Maintenance Requirement for the number of shares dropped. | Increase margin balance by 100% of the value of number of shares dropped. |
| Sell | The following applies to marginable and non-marginable securities. Upon receiving a UR OUT for the cancel orders only: Full Cancel: Increase positions by the number of open shares canceled. Partial Cancel: Increase positions by number of shares to be canceled. Cancel/Replace: Increase positions by entire number of open shares canceled an reduce positions by the number or shares for replacement order. | |
| Rejects | Increase positions by number of shares rejected. | |
| Drops | Increase positions by number of shares dropped. | |

After application of the business rules, the system stores the order in the potential order database stored within mainframe 18. Meanwhile, a recap of the order is transmitted back to the client, who reviews the order, reenters his or her password, and re-transmits the order back to mainframe 18 for execution. If the client disagrees with the recap, the client can abort the order, initiate a new transaction request, or alternatively, exit from the system. Once the recapped order and the password is transmitted to providing server 16, it is compared to the order in the potential order database to ensure the both are identical. If the orders are not identical, an error message is transmitted back to brokerage interface 14. In this way, the logic in the system protects against duplicate order placement and execution of orders in which too much time has elapsed between validation and confirmation of the order, and protects against hackers inserting orders for execution without validation. For example, failure to confirm an order from the potential order database within an adjustable preselected time, typically about 90 seconds after placement of the orders, would constitute a substantial time period between order placement and execution which would cause the system to cancel the order.

By way of example, the interface between brokerage interface 14 and mainframe 18 as performed by providing server 16, may contain the following I/O field map in the transmission of a trade validation.

TABLE III

|  | Brokerage Interface | Providing Server |
|---|---|---|
| Input | verbID[4] | TXN_EVNT_TYP_C[c1], ORD_EVNT_ACTN_C[c1], CANC-TYP-C[c1] |
|  | RegID[16] | ACC_REG_ID[c11] |
|  | Account Number[20] | BRN_1_S[c1] + BRN_1_VL[c2] + BASE_![c1] + BASE_2_&[c6] |
|  | symbol[32] | PRO_SYM_I[c9] |
|  | transaction[16] | TEV_ACTN_C[c2] |
|  | shares[16] | ORD_QTY[m7] |
|  | orderType[16] | ORD_PX_TERM_C[c4] |
|  | stopPrice[16] | STOP_PX[6v6] |
|  | limitPrice[16] | LIMIT_PX[6v6] |
|  | duration[16] | ORD_TIME_C[c3] |
|  | qualifier[16] | ORD_DNR_F[c1], ORD_DNI_F[c1], ORD_AON_F[c1] |
|  | transaction Recommended[4] | ORD_UNSOLICITED_F[c1] |
| Output | struct Stock Trade Request originalRequest struct StockQuoteDate | |

TABLE III-continued

| Brokerage Interface | Providing Server |
|---|---|
| stockQuote | |
| isError[4] | |
| tmpReferenceNumber[64] | POD-REF-N[c34] |
| marketOpen[16] | EXCHANGE-STATUS[c1] |

Verb identification in accordance with the I/O maps include:

TABLE IV

| Verb Description | Verb No. |
|---|---|
| Sign-In | 01 |
| Login | 02 |
| Account Summary | 04 |
| Account Holdings | 05 |
| Holding Open Lots | 06 |
| Account Buys &Sells | 07 |
| Account Open Orders | 08 |
| Account Distributions | 09 |
| Account Cash Activity | 10 |
| Check for Reset Password | 12 |
| Reset Password Acknowledgment | 13 |
| Research By Symbol | 14 |
| Login2 | 15 |
| Account Holdings2 | 16 |
| Check Comm Lines | 25 |
| Stock Trade Request | 100 |
| Stock Trade Confirmation | 101 |
| Mutual Trade Request | 102 |
| Mutual Trade Confirmation | 103 |
| Mutual Fund List | 104 |
| Cancel Stock Trade | 120 |
| Cancel Stock Trade Confirmation | 121 |
| Get Trading Summary | 122 |
| Get Stock Trade Detail | 123 |
| Get Free Trades | 124 |
| Change Trading Password | 125 |

After the order has been successfully validated and compared with the order in the potential order database, a reference number is assigned and confirmation of the order is returned to the client. The order is then forwarded to trading system 26 which may comprise any fault-tolerant mid-range computer such as the Stratus Continuum 1220 Series. Trading system 26 serves to format the order for transmission to one of the exchanges 28 (i.e., New York Stock Exchange, AMEX, NASDAQ, etc.). If order occurs at a time when one of the exchanges is open for business, trading system 26 forward the order to exchange 28 for execution. The current configuration is 6:30 a.m. on any trading day; such configuration is real-time adjustable at any time. If exchange 28 is closed, trading system 26 stores the order in the message queue and recovery file until such time as exchange 28 opens and the order forwarded thereto for execution. Advantageously, this feature permits the trading system of the present invention to function 24 hours per day/7 days per week. This is a distinct improvement over prior art systems which permit order entry, but not validation during all available hours in a day.

By way of example, the interface between brokerage interface 14, and mainframe 18 as performed by providing server 16, may contain the following I/O field map in the transmission of a trade confirmation.

TABLE V

| | Brokerage Interface | Providing Server |
|---|---|---|
| Input | verbID | TXN_EVNT_TYP_C[c1], ORD_EVNT_ACTM_C[c1], CANC-TYP-C[c1] |
| | struct StockTradeRequest originalRequest | |
| | tmp ReferenceNumber[64] | POD-REF-N[c34] |
| | password[32] | cur_password[c30] |
| Output | struct StockTradeRequest confirmationRequest | |
| | orderReferenceNumber[64] | WIRE-C[c3] + ORD-SEQ-N[c5] |
| | orderReferenceDate[32] | ED-EFF-CC[n2] + ED-EFF-YY[n2] + ED-EFF-MM[n2] + ED-EFF-DD[n2] + ED-EFF-T-HH[n2] + ED-EFF-T-MM[n2] + ED-EFF-T-SS[n2] |
| | isError[4] | |
| | marketOpen[16] | EXCHANGE-STATUS[c1] |

The system updates the client's account holdings to reflect order entry and again at trade execution at exchange 28. Once a trade is complete, the client's holdings, activities, etc. are updated and can be reviewed. The system also provides a trade summary which shows all trades that the client performed on-line during that day, or trades that were entered on prior days but have not yet executed even if they have not yet posted to exchange 28. In any event, the system performs nightly updates to reflect all daily activity. In addition, the trade summary lets the user alter trade orders with open quantities that are not yet executed, or have been partially filled.

As an additional feature, the trading system alerts advisor computer 24 operated by a financial advisor at every point where a client interacts with the system. In this way, the financial advisor is advised as to the status of a client account on a real-time basis. Preferably, advisor computer 24 is comprised of the proprietary PainWebber ConsultWorks® workstation. Because the financial advisor is aware of client transaction status, the financial advisor can act in a proactive manner; contacting the client if it appears that the client needs assistance with the transaction, as for example, if there appears to be a problem with the order or if the transaction involves very large sums of money. The financial advisor also receives alerts via advisor computer 24 on certain edits triggered by client attempts to effectuate an on-line order. These alerts indicate to the financial advisor that their client was blocked from entering an order, or that the client validated a particular order.

The financial advisor can also interact with the trading system of the present invention via advisor computer 24 at any time regardless of client use of the system. Financial advisors can perform at least every function in the trading system available to a client. For example, the financial advisor can enroll a new client in the system, obtain real-time quotes, place orders, alter orders, and the like.

In accordance with the present invention, the on-line trading system provides the client and his or her financial advisor with informational messages pertaining to every client-mediated action, as for example, successful or unsuccessful client enrollment, order validation or confirmation. A non-exclusive representative listing of informational messages submitted to the client and financial advisor during the execution of a trade order are listed in Table VI below.

TABLE VI

| Description | Message To Client | Message to Broker |
|---|---|---|
| SUCCESSFUL REQUEST | | |
| SUCCESSFUL VALIDATION | | |
| SUCCESSFUL CONFIRMATION | | |
| INVALID TRADING COMBINATION | Your order cannot be placed at this time. | Invalid trading combination |
| INVALID LIMIT PRICE | Your order has not been placed due to Limit price limitations. | Order exceeds price limits |
| INVALID STOP PRICE | Your order has not been placed due to Stop price limitations. | Order exceeds price limits |
| INVALID STOCK SYMBOL | Your order has not been placed. You have entered an invalid stock symbol. | Invalid Stock Symbol |
| SYSTEM IS UNDER MAINT/SEQ | Your order cannot be placed at this time. The system is currently unavailable. | OLT system unavailable |
| PROBLEM OBTAINING PRICING | Your order cannot be placed at this time. Quote is currently unavailable. | Quote unavailable |
| NO VALID EXCHANGE FOR SYMBOL | Your order has not been placed. A valid stock exchange was not found for this symbol. | No valid exchange for symbol |
| CAN NOT CANCEL-ORDER NOT VALID | Your Cancel request has not been placed. This is not a valid order. | Can't Cancel-Order not valid |
| APPLICATION ERROR | Your order cannot be placed at this time. The system is currently unavailable. | OLT system unavailable |
| NOT AN OPEN ORDER-CAN NOT CXL | Your cancel request has not been placed. This is not an Open order. | Can't Cancel-Not an open order |
| CAN NOT CXL-NOT AN OPEN ORDER | Your Cancel request has not been placed. This is not an Open order. | Can't cancel-Not an open order |
| CAN NOT REPLACE WITH ODD LOT | Your Cancel and Replace request has not been placed. You are not permitted to replace your quantity with less than 100 shares. | Can't Cxl/Rpl with Odd Lot |
| CAN NOT REDUCE TO AN ODD LOT Q | Your Partial Cancel request has not been placed. You are not permitted to reduce your quantity to less than 100 shares. | Can't reduce to Odd Lot |
| CXL AND LEAVES QTY NOT = OPEN | Your Partial Cancel request has not been placed. Cancel quantity and Leaves quantity do not equal your Original quantity. | Cxl and Lvs Qty Not = Open Qty |
| CXL QTY NOT = OPEN QTY | Your Cancel request has not been placed. Your Cancel quantity must equal your Original quantity. | Cxl Qty Not Equal to Open Qty |
| PLEASE ENTER CANCEL QTY | Your Partial Cancel request has not been placed. Please enter Cancel quantity. | Missing Cancel Quantity |
| PLEASE VALIDATE YOUR REQUEST | | |
| INVALID CLIENT ACCOUNT | | |
| EQUITY SECURITIES ONLY - PI | Your order has not been placed. You may enter orders for Equity securities Only. | Equity securities only |
| INVALID INSTRUCTION | N/A | |
| NO POSITION QTY - ORDER REJ | Your order has not been placed. Your sell quantity exceeds the quantity held in your account. | Sell Qty exceeds long Qty. |
| INVALID TIME IN FORCE | | |
| NO START-OF-DAY POS/BAL FND | Your order has not been placed. This security is not held in your account. | Security not long in account. |
| NO BALANCE IN A/C | Your order cannot be placed at this time. | No balance in A/C |
| INVALID ORDER TYPE | Your order cannot be placed at this time. | OLT system unavailable |
| INVALID PRICE MODIFIER | Your order cannot be placed at this time. ( | OLT system unavailable |
| CTPS TERMINALS NOT AVAILABLE | Your order cannot be placed at this time. | OLT system unavailable |
| INVALID TRADING EVENT | Your order cannot be placed at this time. | OLT system unavailable |
| INVALID CANCEL TYPE | Your order cannot be placed at this time. | OLT system unavailable |
| INVALID FRACTION IN PRICE | Your order has not been placed. The fraction in your price is not permitted. | Invalid fraction in price |
| START UPSB PLAYBACK ERROR | No message needed | No message needed |
| OPPOSITE SIDE TRADE EXISTS | Please note that an opposite side order exists in this account. | Opposite side order exists |
| PROBLEM OBTAINING VALID RULES | | |
| TAX LEVY | Your order has not been placed due to a legal restriction on this account. | IRS Tax Levy on Acct.-DA7 |
| MISC RESTRAINT | Your order has not been placed due to an account restriction. | Misc. restraint on acct.-DB5 |
| DEL/APP | Your order has not been placed due to an account restriction. | QP Deliver Approved-K47 |

TABLE VI-continued

| Description | Message To Client | Message to Broker |
|---|---|---|
| DEL/PART | Your order has not been placed due to an account restriction. | Acct. transferring out-K80 |
| DEL/LIQ | Your order has not been placed due to an account restriction. | Acct. transferring out-K98 |
| PERMANENT RESTR | Your order has not been placed due to an account restriction. | Perm. Restriction-425 |
| REST NO SALES | Your order has not been placed due to an account restriction. | Rest. No Sales-468 |
| LEGAL ACC RESTRICT | Your order has not been placed due to an account restriction. | Legal Ldgr Acc Restrict-476 |
| EXCEED ALLOTMENT | By submitting this order you may exceed your trade allotment and may incur a supplemental fee. | May exceed allotment |
| ORDER BLOCKED-NON BLUE SKY | Your order has not been placed due to a legal restriction. | Order blocked non blue sky |
| ORDER BLOCKED-RESEARCH RESTRIC | Your order has not been placed due to a legal restriction. | Research restriction |
| ORDER BLOCKED-LEGAL RESTRICTED | Your order has not been placed due to a legal restriction. | Legal restriction |
| ORDER CONTRARY TO RESEARCH | Please note that PaineWebber's research recommendation is contrary to your order. | Order contrary to research |
| LIMIT PX LESS THAN STOP PX | Your order has not been placed. Limit Price must be higher than or equal to the Stop Price on a Buy order. | Limit Price less than Stop Price |
| LIMIT PX GREATER THAN STOP PX | Your order has not been placed. Limit Price must be lower than or equal to the Stop Price on a Sell order. | Lmt Px greater than Stp Px |
| DNR ONLY VALID WITH GTC/GTC | Your order has not been placed. Do Not Reduce (DNR) is not permitted for day orders. DNR is only applicable with Good Till Canceled (GTC) orders. | DNR only valid with GTC |
| DNI ONLY VALID WITH GTC/GTX | Your order has not been placed. Do Not Increase (DNI) is not permitted for day orders. DNI is only applicable with Good Till Canceled (GTC) orders. | DNI only valid with GTC |
| ODD LOT AON INVALID | Your order has not been placed. All or None (AON) is not permitted with a quantity of less than 100 shares. | AON invalid with Odd Lot |
| ODD LOT OPG INVALID | N/A | |
| ODD LOT OC INVALID | Your order has not been placed. Immediate or Cancel (IOC) is not permitted with a quantity of less than 100 shares. | IOC invalid with Odd Lot |
| ODD LOT FOK INVALID COMBO | Your order has not been placed. Fill or Kill (FOK) is not permitted with a quantity of less than 100 shares. | FOK invalid with Odd Lot |
| GTC/MKT ORDER INVALID COMBO | Your order has not been placed. Order must be either Market or Good Till Canceled (GTC). | GTC/MKT invalid combination |
| NO PAA ALLOTMENT FOUND | | |
| AON/100 SHR INVALID COMBO | Your order has not been placed. All or None (AON) is not permitted with a quantity of 100 shares. AON is only applicable with a quantity of more than 100 shares. | AON &100 shr qty invalid combo |
| STOCK RESTRICTION: CALL IE | This security is restricted and cannot be traded online at this time. | Restricted stock |
| MKT OC INVALID COMBO | Your order has not been placed. Immediate or Cancel (IOC) is not permitted with a Market order. | IOC invalid with MKT order |
| MIXED LOT/OC INVALID COMBO | Your order has not been placed. Immediate or Cancel (IOC) is not permitted for mixed lots, i.e. quantity = 101 through 199, 201 through 299, etc. You may only use IOC with round lots, i.e. 100, 200, etc. | Mixed Lot/IOC invalid combo |
| MIXED LOT/FOK INVALID COMBO | Your order has not been placed. Fill or Kill (FOK) is not permitted for mixed lots, i.e. quantity = 101 through 199, 201 through 299, etc. You may only use FOK with round lots, i.e. quantity = 100, 200, etc. | Mixed Lot/FOK invalid combo |
| MIXED LOT/OPG INVALID COMBO | N/A | |

TABLE VI-continued

| Description | Message To Client | Message to Broker |
|---|---|---|
| OPG/AON INVALID COMBO | N/A | |
| FOK ON STOP LMT ORDER INVALID | Your order has not been placed. Fill or Kill (FOK) is not permitted with a Stop Limit order. | FOK invalid with Stop Limit |
| FOK/PX MOD CLO INVALID COMBO | N/A | |
| FOK ON STOP ORDER INVALID | Your order has not been placed. Fill or Kill (FOK) is not permitted with a Stop order. | FOK on Stop order invalid |
| FOK/AON INVALID COMBO | Your order has not been placed. Fill or Kill (FOK) and All or None (AON) are an invalid combination. | FOK/AON invalid combination |
| INSUFFICIENT FUNDS | Your order has not been placed due to insufficient funds. | Insufficient funds |
| OPG/PX CLO INVALID COMBO | N/A | |
| ORDER BLOCKED - EXCEEDED SHARES | Your order has not been placed due to quantity limitations. | Exceeds share limits |
| ORDER BLOCKED - SOLICITED PWJ | Your order has not been placed due to a legal restriction. | Solicited PWJ |
| OTC BUY ORDER LESS $5/ SHARE | Your order has not been placed. You are not permitted to buy an OTC security with a current price of less than $5 per share. | OTC less than $5/share |
| TRADE PRINCIPAL VALUE >250K | Your order has not been placed due to dollar limitations per transaction. | Order greater than $250K |
| ODD LOT GTC/STP INVALID COMBO | Your order has not been placed. Good Till Canceled (GTC) orders with a Stop price are not permitted with a quantity of less than 100 shares. | GTC/STP invalid combo w/OddLot |
| OL-GTC/STPLMT INVALID COMBO | Your order has not been placed. Good Till Canceled (GTC) orders with a Stop Limit price are not permitted with a quantity of less than 100 shares. | GTC/StpLmt invalid w/Odd Lot |
| OLTD012 LOG SEQ# MAX REACHED | Your order has not been placed. | OLT system unavailable |
| CANCEL QUANTITY MISSING | Your Partial Cancel request has not been placed. Cancel quantity is missing. | Cancel quantity missing |
| LEAVES QUANTITY MISSING | Your Partial Cancel request has not been placed. Leaves quantity is missing | Leaves quantity missing |
| CANNOT PARTIAL CXL TO MIXED LOT | Your Partial Cancel has not been placed. You are not permitted to enter a Mixed Lot quantity (i.e. 150, 250, etc) in the Leave Quantity field. Leave Quantity must be a Round Lot, i.e. 100, 200, etc . | MixedLot invalid w/ PartialCxl |
| DNI INVALID FOR ODD LOT | Your order has not been placed. Do Not Increase (DNI) is not permitted with a quantity of less than 100 shares. | DNI invalid with Odd Lot |
| DNR INVALID FOR ODD LOT | Your order has not been placed. Do Not Reduce (DNR) is not permitted with a quantity of less than 100 shares. | DNR invalid with Odd Lot |
| ORDER HAS CHANGED: RE-VALIDATE | Your order cannot be placed at this time. | OLT system unavailable |
| ORDER IS ALREADY CONFIRMED | Your order has been sent. Please refer to the EDGE Transaction Summary screen for your reference number and order status. | Order already sent |
| NO CHGS MADE TO REPLACEMENT | Your Cancel and Replace request has not been placed. Your replacement order is exactly the same as your original order. | No changes made to CxlRpl order |
| SUBMIT ORDER WITHIN 90 SECONDS | You must submit your order within 90 seconds. Please check EDGE Transaction Summary before resubmitting your order. | Submit order within 90 sec. |
| SYSTEM IS UNDER MAINT/ PL | Your order cannot be placed at this time. | OLT system unavailable |
| SYSTEM IS UNDER MAINT/ BALS | Your order cannot be placed at this time. | OLT system unavailable |
| SYSTEM IS UNDER MAINT/ APPS | Your order cannot be placed at this time. | OLT system unavailable |
| OTC PARTIAL CXL INVALID | Your order has not been placed. An Over the Counter (OTC) order cannot be partially canceled. | OTC Partial Cxl invalid |
| IE INVALID OR REGIST PAST DATE | Your order cannot be plaCed at this time. | Invalid FA or regist. expired |
| DOUBLE CLICK CONFIRM ROLLBACK | Your order has been sent. Please refer to the EDGE Transaction Summary screen for your reference number and order status. | Order already sent |

TABLE VI-continued

| Description | Message To Client | Message to Broker |
|---|---|---|
| MISSING IE SPLIT INFORMATION | Your order cannot be placed at this time. | FA split info missing |
| SAME SIDE OPEN ORDER EXISTS | Please note that a same side, same security order exists in this account. | Same side order exists |
| NO NIGHT ORDERS ALLOWED | Your order cannot be placed at this time. | Night order not allowed |
| CORPORATE ACTIONS | Your order has not been placed due to a pending corporate action for this security. | Corporate action pending |
| SELLS NOT ALLOWED | Your order has not been placed due to an account restriction. | Sells not allowed |
| ORDER TYPE NOT ALLOWED | Your order cannot be placed at this time. | Order type not allowed |
| CORPORATE ACTION - CASH DIVIDEND | This security has declared a Cash Dividend. | Cash Dividend pending |
| CORPORATE ACTION - STOCK DIVIDEND | This security has declared a Stock Dividend. | Stock Dividend pending |
| CORPORATE ACTION - STOCK SPLIT | This security has declared a Stock Split. | Stock Split pending |
| NON-LG NATL COLLECTION | Your order has not been placed due to an account restriction. | Non-Ig Natl Coll-646 |
| REST LIQ ONLY | Your order has not been placed due to an account restriction. | Rest Liq Only-662 |
| DELIVER | Your order has not been placed due to an account restriction. | 412 Deliver-7E1 |
| DEL COMPLETE | Your order has not been placed due to an account restriction. | 412 Del Complete-7G8 |
| DEL/TTEE | Your order has not been placed due to an account restriction. | QP Del/TTEE-8B4 |
| LGL LITIGATION | Your order has not been placed due to an account restriction. | Lgl Litigation-808 |
| QUANTITY MUST REMAIN THE SAME | Your Cancel and Replace request has not been placed. You are not permitted to change the quantity on this order. | Can't chg qty for Cxl/Rpl |
| CORP ACTION - CANCEL ERROR | Your Cancel request has not been placed due to a pending corporate action for this security. | Corporate action pending |
| CANNOT CXL AN EXPIRED ORDER | Your Cancel request cannot be placed. Your DAY order has already expired. | Can't cxl an expired order |
| ACCOUNT REQUIRED | Your order cannot be placed at this time. | OLT system unavailable |
| TRANSACTION ID REQUIRED | Your order cannot be placed at this time. | OLT system unavailable |
| PRESENTATION LAYER REQUIRED | Your order cannot be placed at this time. | OLT system unavailable |
| BRANCH REQUIRED | Your order cannot be placed at this time. | OLT system unavailable |
| NEXT/PREV PAGING REQUIRED | Your order cannot be placed at this time. | OLT system unavailable |
| SEND EXCHANGE DATE REQUIRED | Your order cannot be placed at this time. | OLT system unavailable |
| SEQUENCE NUMBER REQUIRED | Your order cannot be placed at this time. | OLT system unavailable |
| OLT TRADING NOT AVAILABLE | Your order cannot be placed at this time. | OLT system unavailable |
| INVALID REQUEST - NO ORDER FND | Your order cannot be placed at this time. | No order found |

Another component useful to the trading system of the present invention is a customer service center capable of addressing all client inquires pertaining to the online trading system. For example, the customer service center may comprise a centralized center reachable by toll-free telephone access.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A financial server system for trading comprising:
a plurality of client terminals;
one or more financial advisor terminals; and
a server configured to:
   receive a plurality of electronic trade orders from the plurality of client terminals over a communication network, each electronic trade order comprising a request to trade a financial instrument;
   for each electronic trade order, transmit an alert message in real-time over the communication network to the one or more financial advisor terminals, each alert message comprising information obtained from the electronic trade order;
   validate the information obtained from each of the plurality of electronic trade orders according to one or more business rules;
   transmit results from validation of the plurality of electronic trade orders to the plurality of client terminals, the results indicating whether an electronic trade order is validated or not validated;

further transmit to those client terminals associated with a validated electronic trade order a request for confirmation of the validated electronic trade order and executing the validated electronic trade order upon receipt of the requested confirmation; and for those client terminals associated with a non-validated trade order, further transmit an alert message in real-time to the one or more financial advisor terminals including information associated with the non-validated trade order.

2. The system of claim 1, wherein assistance information is provided to the plurality of client terminals through a trade wizard helper program.

3. The system of claim 1, wherein the one or more business rules are designed to limit a risk in trading financial instruments and can be applied in real time.

4. The system of claim 1, wherein a user of the one or more financial advisor terminals can make corrections to each electronic trade order.

5. The system of claim 4, wherein the user of the one or more financial advisor terminals can make the corrections in real-time.

6. The system of claim 1, wherein the alert message includes reasons why the non-validated trade order was not validated.

7. A computerized method for trading in a financial server system comprising:

receiving a plurality of electronic trade orders from a plurality of client terminals over a communication network, each electronic trade order comprising a request to trade a financial instrument;

for each electronic trade order, transmitting an alert message in real-time over the communication network to one or more financial advisor terminals, each alert message comprising information obtained from the electronic trade order;

validating the information obtained from each of the plurality of electronic trade orders according to one or more business rules;

transmitting results from validation of the plurality of electronic trade orders to the plurality of client terminals, the results indicating whether an electronic trade order is validated or not validated;

further transmitting to those client terminals associated with a validated electronic trade order a request for confirmation of the validated electronic trade order and executing the validated electronic trade order upon receipt of the requested confirmation; and for those client terminals associated with a non-validated trade order, further transmitting an alert message in real-time to the one or more financial advisor terminals including information associated with the non-validated trade order.

\* \* \* \* \*